INVENTOR
THEODORE WEBER, JR.
BY
Byrly, Townsend, Watson & Churchill
ATTORNEYS.

INVENTOR
THEODORE WEBER, JR.
BY
Byerly, Townsend, Watson & Churchill
ATTORNEYS.

Feb. 11, 1969 T. WEBER, JR 3,426,619

INTEGRATOR

Filed Nov. 8, 1966 Sheet 3 of 3

INVENTOR
THEODORE WEBER, JR.
BY
Byerly, Townsend, Watson & Churchill
ATTORNEYS.

United States Patent Office 3,426,619
Patented Feb. 11, 1969

3,426,619
INTEGRATOR

Theodore Weber, Jr., Nyack, N.Y., assignor to Cam Technology Incorporated, Elmsford, N.Y., a corporation of New York Filed Nov. 8, 1966, Ser. No. 592,858
U.S. Cl. 74—690 7 Claims
Int. Cl. F16h *37/08, 15/14, 15/28*

The present invention relates to an integrator, and particularly to the type of integrator commonly known as the ball and disk type.

A typical known ball and disk integrator employs a rotating disk as the input, a juxtaposed roll or cylinder as the output and a pair of balls in rolling contact in tandem between the disk and cylinder. When the balls are positioned by a carriage with the line of their centers coincident with the axis of rotation of the disk there is zero output from the device. As the center line of the balls is translated away from the center of the disk the output increases either in the positive or negative direction depending upon which side of the disk is engaged by the balls. This known integrator has a serious drawback since the balls tend to cause undue wear at the center of the plate when the device is arranged for zero output. In addition, because the point of contact of the balls must traverse the center of the disk, it is necessary to provide the rear of the disk with a substantial hub and a costly arrangement of bearings.

Another type of integrator employs wheels in contact with the disk for deriving a direct output. Heretofore, in order to avoid the zero output wear problem with the wheeled type integrator, two output wheels have been employed driving a differential in order to obtain an output proportional to the algebraic sum of their respective outputs. By this arrangement zero output is obtained when the wheels are equally distant from the center of the disk. The wear problem and the disk mounting problem are thereby eliminated. Because of its greater accuracy, it would seem desirable to employ the double output arrangement with the ball type of integrator. However, as far as the present inventor is aware, this has never been done. It is assumed that the reason is that no one knew heretofore how to construct a double ball and disk type of integrator wherein uniform and equal driving pressure could be maintained on both pairs of balls simultaneously throughout the range of adjustment thereof.

It is an object of the present invention to provide a ball and disk type of integrator of the double output type wherein the engaging pressure on the ball pairs is substantially equal throughout the range of the device. This is essential in order to avoid slippage of one pair or the other.

Thus, in accordance with the invention there is provided an integrator comprising a disk with at least one planar surface mounted for rotation at one end of a shaft about an axis normal to said surface, means for rotating the disk, a pair of coaxial cylindrical members mounted for independent rotation about their respective axes, the cylinder axes being parallel to the planar surface but spaced therefrom and lying in a plane normal to the axis of the shaft, the members being located opposite diametrically opposed sides of the disk, differential means coupled to both of the members for providing an output proportional to the algebraic sum of the angular rotation thereof, a first pair of balls disposed in rolling contact between the disk and one of the cylindrical members, a second pair of balls disposed in rolling contact between the disk and the other of the cylindrical members, a ball carriage for positioning each of the pairs of balls with their centers on a line normal to the planar surface, the carriage being mounted for controlled translation parallel to the axes of the cylindrical members for varying the relative radial distance of the ball pairs from the axis of rotation of the disk, the disk and the cylindrical members being mounted for relative movement toward and away from one another, and means for urging the disk and the cylindrical members toward each other to maintain frictional engagement with both of the pairs of balls.

In addition, the invention involves the mounting of the disk upon the shaft so as to provide for axial movement relative thereto and the provision of means for urging the disk and cylindrical members toward each other which comprises means for applying a loading force to the side of the disk opposite the planar surface and means for maintaining the center of application of the loading force midway between the lines of centers of the first and second pairs of balls irrespective of lateral translation of the pairs of balls.

The invention will be better understood after reading the following detailed description of one preferred embodiment thereof with reference to the appended drawings wherein.

Figures 1, 4:
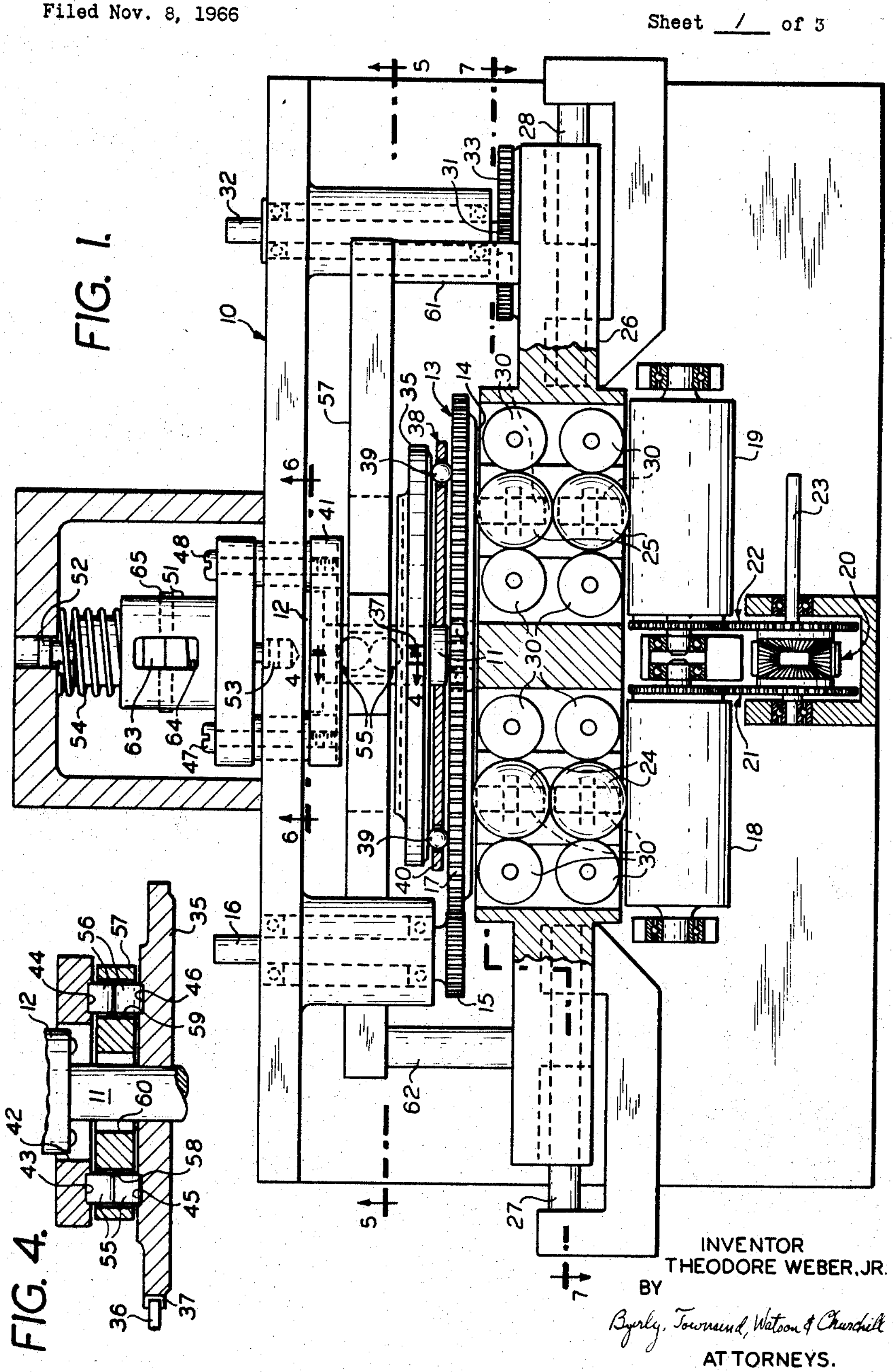
FIGURE 1 is a front elevational view, partly in section showing an integrator constructed in accordance with the invention.
FIGURE 4 is a fragmentary sectional view taken along line 4—4 in FIGURE 1.

Referring to the drawings, the frame of the new integrator is shown generally at 10. A shaft 11 is joined as best seen in FIGURE 6 by a mounting flange 12 to the frame 10.

The disk 13 with the planer surface 14 is mounted for rotation at the end of the shaft 11 opposite the flange 12. The axis of the shaft 11 is normal to the surface 14. A pinion 15 mounted at the end of an arbor 16 meshes with the teeth 17 on the periphery of the disk 13. This arrangement provides means for rotating the disk 13.

Figures 2, 3, 6:
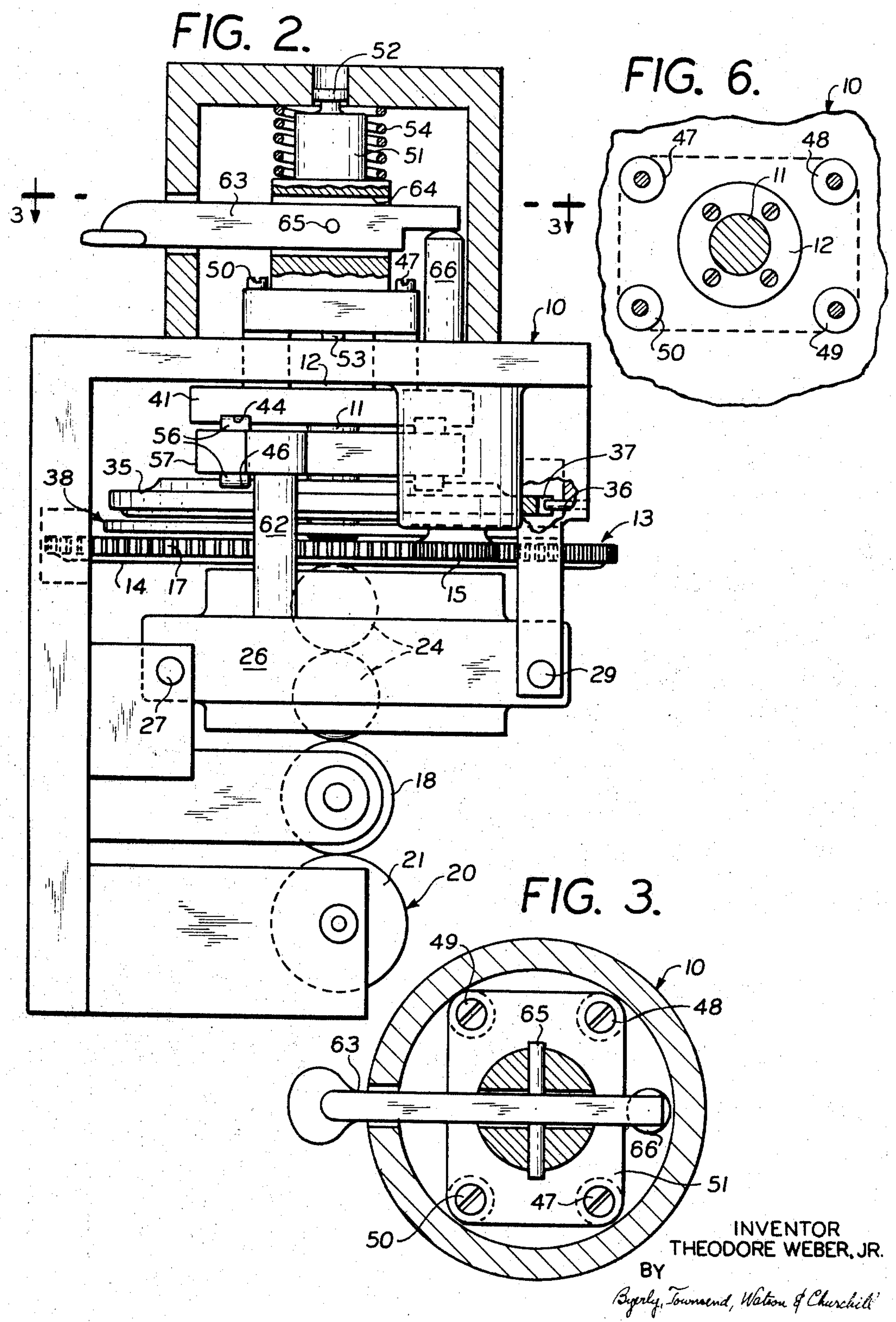
FIGURE 2 is a side elevational view as seen from the left of FIGURE 1, with portions in section.
FIGURE 3 is a sectional view taken along line 3—3 in FIGURE 2.
FIGURE 6 is a fragmentary sectional view looking upward along line 6—6 in FIGURE 1.

A pair of coaxial cylindrical members or cylinders 18 and 19 are mounted for independent rotation about their respective axes as best seen in FIGURES 1 and 2. The cylinder axes are parallel to the planar surface 14 of the disk 13 but spaced therefrom and lying in a plane normal to the axis of the shaft 11. As seen in FIGURE 1, the cylinders 18 and 19 are located opposite diametrically opposed sides of the disk 13.

A differential shown generally at 20 is coupled to both of the cylinders 18 and 19 by the respective gear trains 21 and 22. The differential 20 provides an output through shaft 23 which is proportional to the algebraic sum of the angular rotation of the two cylinders 18 and 19. If the cylinders 18 and 19 are rotating in opposite directions at the same rate the output at shaft 23 will be zero.

Figures 5, 7:
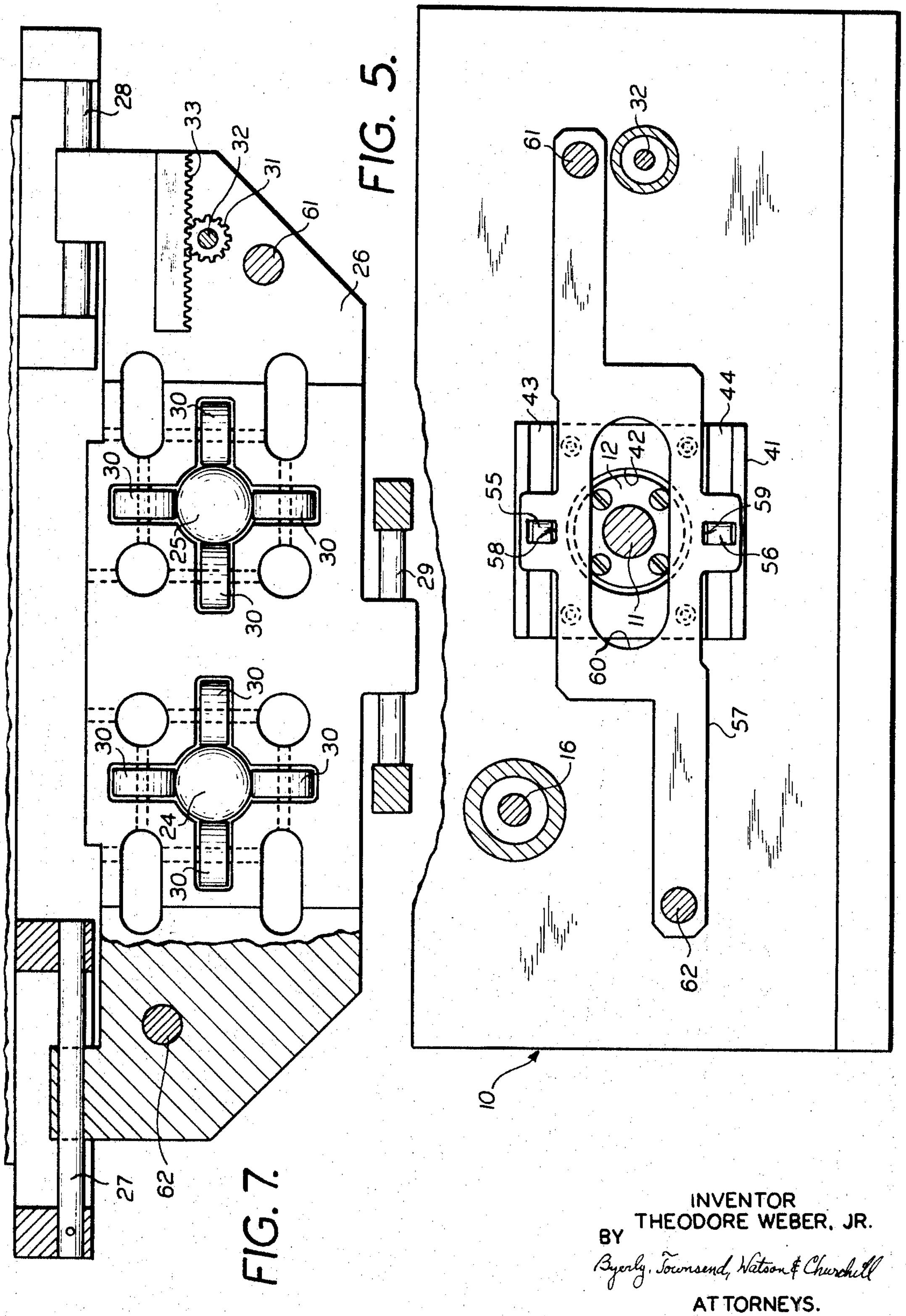
FIGURE 5 is a sectional view looking upward along line 5—5 in FIGURE 1.
FIGURE 7 is a sectional view taken along line 7—7 in FIGURE 1.

A first pair of balls 24 is disposed in rolling contact between the disk 13 and the cylindrical member 18. A second pair of similar balls 25 is disposed in rolling contact between the disk 13 and the other cylindrical member 19. A ball carriage 26 is supported for linear movement, as best seen in FIGURE 7, by the three guide rails 27, 28 and 29. With the aid of the plurality of rollers 30, the carriage 26 positions each of the pairs of balls 24 and 25 with their centers on a line normal to the surface 14 of the disk 13. The linear or translatory movement of carriage 26 is parallel to the axes of the cylindrical members 18 and 19. Movement of the carriage varies the relative radial distance of the ball pairs 24 and 25 from the axis of rotation of the disk 13. Translation of the carriage 26 is accomplished by means of pinion 31 mounted at the end of arbor 32 and engaging the rack 33 which is joined to the carriage.

The disk 13 is mounted at the end of the shaft 11, which may be of reduced diameter, as shown, by means of a frictionless bearing 34, e.g., a ball bearing of conventional design. The inner race of the bearing is mounted on the reduced diameter end of shaft 11 with a snug but sliding fit while the outer race is secured in disk 13 by a press fit. By this arrangement, the disk 13 is, neglecting other restraints, capable of axial movement relative to the shaft 11.

A thrust plate 35 is mounted on the shaft 11 for axial movement relative thereto. This is accomplished by arranging for a sliding fit between the shaft 11 and a central aperture in the plate 35. The plate 35 is restrained from rotation by a pin 36 which is supported by the frame 10 and engages the notch 37 in the plate 35. A thrust bearing 38 is mounted on the shaft 11 between the thrust plate 35 and the disk 13 for communicating pressure to the latter. The thrust bearing 38 may consist of a circular array of bearing elements or balls 39 positioned concentric with the shaft 11 by means of the retainer 40. The thrust bearing makes a running fit with respect to the shaft so that it is free to rotate and move axially with respect thereto. The balls 39 make rolling contact with both the plate 35 and the disk 13.

A pressure plate 41 is disposed upon the shaft 11, also for axial movement therealong. The aperture 42 in the pressure plate should be large enough to clear the flange 12 of the shaft 11. This is best seen in FIGURE 5.

Both the pressure plate 41 and the thrust plate 35 have confronting planar surfaces formed by the bottom walls of rectangular channels 43 and 44 in the former and 45 and 46 in the latter. The bottom walls of confronting pairs of the channels are located in parallel and in planes normal to the axis of the shaft 11.

By means of the posts and bolts 47, 48, 49 and 50, the pressure plate 41 is joined to a follower member 51. This is best seen in FIGURES 1 and 3. Guide pins 52 and 53, making sliding fit with bores in the frame 10, guide the follower 51 for linear movement coaxially related to the shaft 11. The posts 47, 48, 49 and 50 are arranged to make a sliding fit with apertures in the frame 10. A spring 54, as seen in FIGURE 1, resiliently urges the follower 51, and thereby the pressure plate 41, toward the end of the shaft 11 carrying the disk 13. Force transmitting means in the form of the two pairs of rollers, 55 and 56, bridge the gap between the pressure and thrust plates 41 and 35, respectively, as best seen in FIGURES 4 and 5. The pairs of rollers 55 and 56 ride in the channels 43, 44, 45 and 46. The width of the channels should be proportioned relative to the axial length of the rollers in the pairs 55 and 56 so as to prevent undue lateral movement while not restricting rolling motion along the length of the channels. It should be observed that the two pairs of rollers 55 and 56 are located equally distant from and on the opposite side of the plane passing through the axis of the shaft 11. This is best seen in FIGURE 4. The rollers are also located along a line normal to that plane. That is, the line passing through the line of contact of the rollers in each pair is normal to the axis of the shaft 11.

Another carriage 57 provided with the slots 58 and 59 for accommodating the respective roller pairs 55 and 56 is arranged to impart controlled lateral translation to the pairs of rolling members. The movement, of course, is along the rectangular channels 43, 44, 45 and 46. It will be seen that these paths are parallel to the plane passing through the axis of the shaft 11 which plane also passes through the axes of the cylindrical members 18 and 19.

As best seen in FIGURE 5, the additional carriage 57 is provided with a slotted aperture 60 for clearing the shaft 11. In addition, the carriage 57 is joined by the posts 61 and 62 to the carriage 26. Thus, it will be seen that both carriages move in unison when the pinion 31 is caused to rotate.

The pairs of rollers 55 and 56 merely ride in the slots 58 and 59 of the carriage 57. As best seen in FIGURE 5, these slots are proportioned to make sliding contact with the cylindrical surface of the rollers while they afford substantial clearance relative to the ends of the rollers. As seen from FIGURES 1 and 4, the rollers are free to move relative to the carriage 57 along a line parallel to the axis of the shaft 11. Hence, it should be apparent that by joining the two carriages 26 and 57 the rollers will always contact the thrust plate 35 at a point midway between the lines of centers of the first and second pairs of balls 24 and 25, respectively. In summary, the thrust plate 35, the thrust bearing 38, and the disk 13 are all mounted for axial movement relative to the shaft 11, and the same is true of the pairs of balls 24 and 25. The geometry of the device, neglecting deviations due to manufacturing tolerance, is such as to maintain parallelism between the elements 13, 35 and 38, and at the same time maintain them in a position substantially normal to the axis of the shaft 11. Thus, it will be understood that the shaft 11 may be considered as not offering any restraint with respect to cocking motion relative to the shaft. As a consequence, the objectives of the device are achieved and the pressure on ball pair 24 will at all times be substantially equal to the pressure upon ball pair 25.

On occasion it may be desirable to be able to adjust the output shaft 23 independent of the arbor 16. To avoid damage to the device, there is provided a lever 63 which passes through the slot 64 and is pivoted at 65 to the follower 51 as best seen in FIGURE 2. One end of the lever 63 rests on the post 66, as shown. Referring to FIGURE 2, it will be seen that as the exposed end of the lever 63 is raised it will raise the follower 51 and thereby the pressure plate 41 taking the load off the ball pairs 24 and 25 and the cylinders 18 and 19.

Having described the invention with reference to a presently preferred embodiment thereof, it will be understood that changes may be made in the details of construction without departing from the true spirit of the invention as defined in the appended claims.

What is claimed is:

1. An integrator comprising a disk with at least one planar surface mounted for rotation at one end of a shaft about an axis normal to said surface, means for rotating said disk, a pair of coaxial cylindrical members mounted for independent rotation about their respective axes, said cylinder axes being parallel to said planar surface but spaced therefrom and lying in a plane common to the axis of said shaft, said members being located opposite diametrically opposed sides of said disk, differential means coupled to both of said members for providing an output proportional to the algebraic sum of the angular rotation thereof, a first pair of balls disposed in rolling contact between said disk and one of said cylindrical members, a second pair of balls disposed in rolling contact between said disk and the other of said cylindrical members, a ball carriage for positioning each of said pairs of balls with their centers on a line normal to said planar surface, said carriage being mounted for controlled translation parallel to the axes of said cylindrical members for varying the relative radial distance of said ball pairs from the axis of rotation of said disk, said disk and said cylindrical members being mounted for relative movement toward and away from one another, and means for urging said disk and said cylindrical members toward each other to maintain equal frictional engagement with both of said pairs of balls.

2. An integrator according to claim 1, wherein the mounting of said disk upon said shaft is arranged to provide for axial movement relative thereto, and said means for urging the disk and cylindrical members toward each other comprises means for applying a loading force to the side of said disk opposite said planar surface, and means for maintaining the center of application of said loading force midway between the lines of centers of said first and second pairs of balls irrespective of lateral translation of said pairs of balls.

3. An integrator according to claim 1, wherein the mounting of said disk upon said shaft is arranged to provide for axial movement relative thereto, a thrust plate is mounted on said shaft for axial movement relative thereto, a thrust bearing is mounted on said shaft between said thrust plate and said disk for communicating pressure to the latter, means are provided for applying a loading force to said thrust plate, and means for maintaining the center of application of said loading force midway between the lines of centers of said first and second pairs of balls irrespective of laterial translation of said pairs of balls.

4. An integrator according to claim 3, wherein means are provided for preventing rotation of said thrust plate on said shaft while not interfering with axial movement thereof, said thrust bearing including a circular array of bearing elements concentric with said shaft and in rolling engagement with both said thrust plate and said disk, a pressure plate disposed upon said shaft for axial movement therealong, both said pressure plate and said thrust plate having confronting planar surfaces in parallel and normal to the axis of said shaft, means for resiliently urging said pressure plate toward said one end of the shaft, and force transmitting means bridging the gap between said pressure and thrust plates and in engagement with both, said force transmitting means being disposed for controlled lateral translation for applying said loading force to said thrust plate midway between the line of centers of said first and second pairs of balls.

5. An integrator according to claim 4, wherein said force transmitting means comprises two pairs of rolling members, each pair being disposed in tandem between the confronting planar surfaces of said thrust and pressure plates with the two pairs being located equidistant from and on opposite sides of said plane, said two pairs being located additionally along a line normal to said plane, and another carriage for imparting said controlled lateral translation to said pairs of rolling members along paths parallel to said plane.

6. An integrator according to claim 5, wherein said carriages are joined for conjoint movement.

7. An integrator according to claim 6, wherein means are provided for moving said pressure plate away from said one end of the shaft to remove pressure from said pairs of balls.

References Cited

UNITED STATES PATENTS

| | | | |
|---|---|---|---|
| 751,564 | 2/1904 | Sargent | 74—196 XR |
| 2,487,256 | 11/1949 | Miller et al. | 74—198 XR |
| 2,762,239 | 9/1956 | Van Dyke | 74—690 |
| 2,837,929 | 6/1958 | Crooke | 74—196 XR |

ARTHUR T. McKEON, *Primary Examiner.*

U.S. Cl. X.R.

74—196, 198